United States Patent
Kobayashi

[11] Patent Number: 6,052,484
[45] Date of Patent: Apr. 18, 2000

[54] IMAGE-REGION DISCRIMINATING METHOD AND IMAGE-PROCESSING APPARATUS

[75] Inventor: Setsuya Kobayashi, Ikoma-gun, Japan

[73] Assignee: Sharp Kabushiki Kaisha, Japan

[21] Appl. No.: 08/920,434

[22] Filed: Aug. 29, 1997

[30] Foreign Application Priority Data

Sep. 9, 1996 [JP] Japan ................................. 8-238205

[51] Int. Cl.[7] .............................. G06K 9/46; G06K 9/56; G06K 9/40; G06T 5/20
[52] U.S. Cl. ..................... 382/195; 382/205; 382/176; 382/261
[58] Field of Search .................................. 382/261, 260, 382/263, 264, 266, 176, 205, 195, 199; 358/462

[56] References Cited

U.S. PATENT DOCUMENTS

| | | | |
|---|---|---|---|
| 5,339,365 | 8/1994 | Kawai et al. | ............................. 382/176 |
| 5,497,249 | 3/1996 | Koizumi et al. | . |

FOREIGN PATENT DOCUMENTS

| | | |
|---|---|---|
| 0 710 004 A2 | 5/1996 | European Pat. Off. . |
| 34 46 880 A1 | 7/1985 | Germany . |
| 63-040468 | 2/1988 | Japan . |
| 01057877 | 3/1989 | Japan . |
| 2-67869 | 3/1990 | Japan . |
| 4-188948 | 7/1992 | Japan . |
| 4-270561 | 9/1992 | Japan . |

OTHER PUBLICATIONS

Copy of Communication dated Nov. 19, 1998, issued by the European Patent Office re corresponding European Pat. Appln. No. 97115206.1, (4 pages).

Primary Examiner—Scott Rogers
Attorney, Agent, or Firm—David G. Conlin; Richard E. Gamache; Dike, Bronstein, Roberts & Cushman, LLP

[57] ABSTRACT

A degree of frequency and a comparison difference value are used as an amount of feature that is to be inputted to a discrimination circuit so as to discriminate the kind of regions. The degree of frequency is represented by the smaller of two sums, that is, the sum of absolute values of the density-level difference between pixels adjoining in the line direction of the pixels within the specific region and the sum of absolute values of the density-level difference between pixels adjoining in the direction orthogonal to the line of the pixels, which is obtained by a frequency-degree extracting circuit. Further, the comparison difference value is represented by the comparison difference between a maximum value and a minimum value in the density levels of all pixels within the specified region, which is obtained by the comparison difference circuit. Among a plurality of preset filters, one of the preset filters is selected based upon the amount of feature, and a filtering process is carried out by a filtering-process circuit by using the filter. With this arrangement, discrimination is made as to the kind of region, and a proper filtering process is carried out depending on which region, among the character region, photograph region and halftone-dot region, each focused pixel in an image that has been read belongs to.

19 Claims, 11 Drawing Sheets

| r(i-2, j-2) | r(i-1, j-2) | r(i, j-2) | r(i+1, j-2) | r(i+2, j-2) |
|---|---|---|---|---|
| r(i-2, j-1) | r(i-1, j-1) | r(i, j-1) | r(i+1, j-1) | r(i+2, j-1) |
| r(i-2, j) | r(i-1, j) | r(i, j) | r(i+1, j) | r(i+2, j) |
| r(i-2, j+1) | r(i-1, j+1) | r(i, j+1) | r(i+1, j+1) | r(i+2, j+1) |
| r(i-2, j+2) | r(i-1, j+2) | r(i, j+2) | r(i+1, j+2) | r(i+2, j+2) |

PHO : PHOTOGRAPH

FIG. 7

| K 6 | K 5 | K 4 | K 5 | K 6 |
|-----|-----|-----|-----|-----|
| K 5 | K 3 | K 2 | K 3 | K 5 |
| K 4 | K 2 | K 1 | K 2 | K 4 |
| K 5 | K 3 | K 2 | K 3 | K 5 |
| K 6 | K 5 | K 4 | K 5 | K 6 |

FIG. 8

|  | K 1 | K 2 | K 3 | K 4 | K 5 | K 6 |
|---|---|---|---|---|---|---|
| CHARACTER 1 | 13 | -2 | 0 | -1 | 0 | 0 |
| CHARACTER 2 | 9 | -1 | 0 | -1 | 0 | 0 |
| CHARACTER 3 | 5 | -1 | 0 | -1 | 0 | 0 |
| NET POINT 1 | 24/48 | 4/48 | 0 | 2/48 | 0 | 0 |
| NET POINT 2 | 12/24 | 2/24 | 0 | 1/24 | 0 | 0 |
| NET POINT 3 | 4/8 | 1/8 | 0 | 0 | 0 | 0 |
| MIXED PORTION | 1 | 0 | 0 | 0 | 0 | 0 |
| PHOTOGRAPH | 1 | 0 | 0 | 0 | 0 | 0 |

FIG. 9 (a)

|   |   |     |     |   |
|---|---|-----|-----|---|
| 0 | 0 | 0   | 0   | 0 |
| 0 | 0 | 1/8 | 0   | 0 |
| 0 | 1/8 | 4/8 | 1/8 | 0 |
| 0 | 0 | 1/8 | 0   | 0 |
| 0 | 0 | 0   | 0   | 0 |

FIG. 9 (b)

|   |   |    |    |    |
|---|---|----|----|----|
| 0 | 0 | -1 | 0  | 0  |
| 0 | 0 | -1 | 0  | 0  |
| -1 | -1 | 9 | -1 | -1 |
| 0 | 0 | -1 | 0  | 0  |
| 0 | 0 | -1 | 0  | 0  |

FIG. 9 (c)

|   |   |   |   |   |
|---|---|---|---|---|
| 0 | 0 | 0 | 0 | 0 |
| 0 | 0 | 0 | 0 | 0 |
| 0 | 0 | 1 | 0 | 0 |
| 0 | 0 | 0 | 0 | 0 |
| 0 | 0 | 0 | 0 | 0 |

IMAGE-REGION DISCRIMINATING METHOD AND IMAGE-PROCESSING APPARATUS

FIELD OF THE INVENTION

The present invention relates to an image-region discriminating method for selecting an appropriate process in response to a signal that is representative of an image that has been read and for exactly discriminating an image region in order to precisely reproduce this image, in a digital copying machine, a scanner and other apparatuses, and also concerns an image-processing apparatus using such a method.

BACKGROUND OF THE INVENTION

Conventionally, in a digital copying machine, a scanner and other apparatuses, an original document is read by a CCD or other devices, and the image-data signal obtained in such a reading operation is subjected to image-processing operations in order to improve the image quality. For example, in such an image-processing method, various features are extracted from image information that has been read, and based upon the features, a region-discriminating process can be carried out so that a high-quality image-processing operation is carried out by using the results of this region-discriminating process.

One of the above-mentioned image-processing methods is disclosed by, for example, "Image-Processing Apparatus" in Japanese Laid-Open Patent Publication No. 188948/1992 (Tokukaihei 4-188948). In this method, the average value of density levels in all the pixels within a specified region is given as a threshold value. Then, if the difference between the threshold value and the average dispersion value of density levels of pixels is large, the above-mentioned specified region is discriminated as a character-image region. In contrast, if the difference between the threshold value and the average dispersion value is relatively small, the specified region is discriminated as a half-tone-image region. Based upon the result of the discrimination, the image-processing apparatus carries out the image-processing.

Moreover, an image-processing method similar to the above-mentioned method is used in an "Image-Processing Apparatus" disclosed by Japanese Laid-Open patent Publication No. 270561/1992 (Tokukaihei 4-270561). In this case, two large and small threshold values THb and THc are set with respect to density levels of the pixels within a specified region. Then, portions having the density level higher than THb and portions having the density level lower than THc are discriminated as character-image regions, and portions having density levels between THb and THc are discriminated as half-tone regions.

However, in the above-mentioned conventional arrangements, depending on image-data signals within the specified region, discrimination is made so as to identify the kind of region with respect to the entire specified region. The resulting problem is that erroneous discrimination tends to occur depending on how the specified region is selected.

Moreover, in the above-mentioned conventional arrangements, only the difference between the average value and the average dispersion in the density level or only the predetermined threshold value is used as the degree of feature so as to make comparisons on the magnitude of the density level of each pixel. Therefore, since it is not possible to sufficiently discriminate features of the image region, the resulting problem is degradation in discrimination precision in discriminating the various kinds of regions.

SUMMARY OF THE INVENTION

The present invention has been developed to solve the above-mentioned problems, and its objective is to provide an image-region discriminating method for improving the discrimination precision with respect to the kinds of regions, and also to provide an image-processing apparatus capable of carrying out an image-reading operation with high picture quality by executing appropriate image-processing operations based upon the result of the kind of region thus discriminated.

An image-region discriminating method of the present invention is provided with steps of: based upon all image data within a specified region including a focused pixel that serves as a target for discriminating the feature of a region to which respective pixels on an image belong and a plurality of adjacent pixels located around the focused pixel, extracting the amount of feature indicating the feature of the region to which the focused pixel belongs, and discriminating the kind of the region to which the focused pixel belongs based upon the amount of feature.

In the above-mentioned discriminating method, with respect to each focused pixel $\gamma$ by which the feature of the region is to be discriminated, the kind of the region to which the focused pixel $\gamma$ belongs is discriminated by also utilizing the image data of the adjacent pixels surrounding the focused pixel $\gamma$. Thus, it is possible to improve the discrimination precision of the region to which the focused pixel $\gamma$ belongs; consequently, for example, it becomes possible to carry out appropriate image processing operations in accordance with the results of discrimination.

The image-processing apparatus of the present invention, which carries out appropriate image-processing operations by using the above-mentioned image-region discriminating method, is provided with a feature-amount extracting circuit which, based upon all image data within a specified region including a focused pixel that serves as a target for discriminating the feature of a region to which respective pixels on an image belong and a plurality of adjacent pixels located around the focused pixel, extracts the amount of feature indicating characteristics of the region to which the focused pixel belongs; a discrimination circuit which releases discrimination information on a region to which the focused pixel belongs based upon the amount of feature; a filter-selecting circuit which, based upon the discrimination information, selects a filter among a plurality of set filters that is appropriate for the discrimination information; and a filtering-process circuit for carrying out a filtering-process by using the selected filter.

In the above-mentioned arrangement, with respect to multi-value image data obtained from a read original document, discrimination can be made as to which kind of region the focused pixel belongs to, based upon all image data within the specified region including the focused pixel. Since the filtering process is carried out based upon the discrimination information, it is possible to carry out an optimal image process that is suitable for the image conditions. Therefore, it becomes possible to improve picture quality that is read during an image-processing operation.

For a fuller understanding of the nature and advantages of the invention, reference should be made to the ensuing detailed description taken in conjunction with the accompanying drawings.

DESCRIPTION OF THE EMBODIMENTS
Embodiment 1

Referring to Figures, the following description will discuss one embodiment of the present invention.

Figure 1:
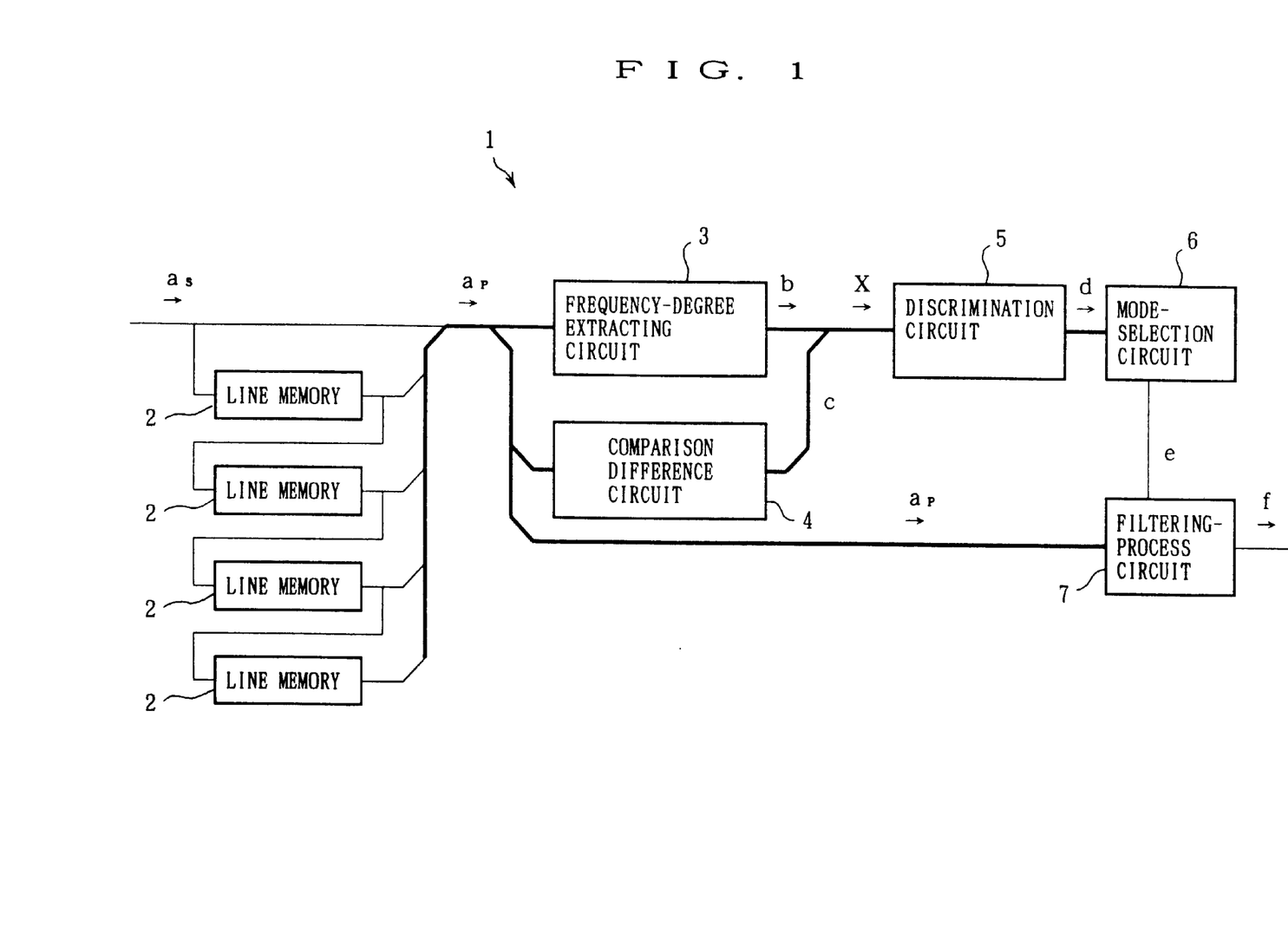
FIG. 1 is a block diagram showing a schematic construction of an image-processing apparatus in accordance with one embodiment of the present invention.

As illustrated in FIG. 1, the image-processing apparatus 1 of the present embodiment is provided with: line memories 2, a frequency-degree extracting circuit 3 and a comparison difference circuit 4, both serving as a feature-amount extracting circuit, a discrimination circuit 5, a mode-selection circuit 6 and a filtering-process circuit 7.

The line memories 2 have such a function that they allow an inputted image-data signal $a_s$ from a specified region to become parallel. Based upon the image-data signal that is made parallel (hereinafter referred to as the parallel image-data signal) $a_p$, the frequency-degree extracting circuit 3 and the comparison difference amplifier 4 extract the degree of frequency b and the comparison difference value c respectively, which will be described later. The discrimination circuit 5 discriminates the kind of region to which the specified region belongs based upon the resulting degree of frequency b and comparison difference value c. The mode-selection circuit 6 selects one of a plurality of predetermined filtering modes e based upon the discrimination result d that is discrimination information for discriminating the kind of region. In other words, the mode-selection circuit 6 functions as a filter-selecting circuit. Further, the filtering-process circuit 7 carries out a filtering process by using a coefficient map that has been specified based on the filtering mode e selected for an image located in the specified region.

Figure 2:
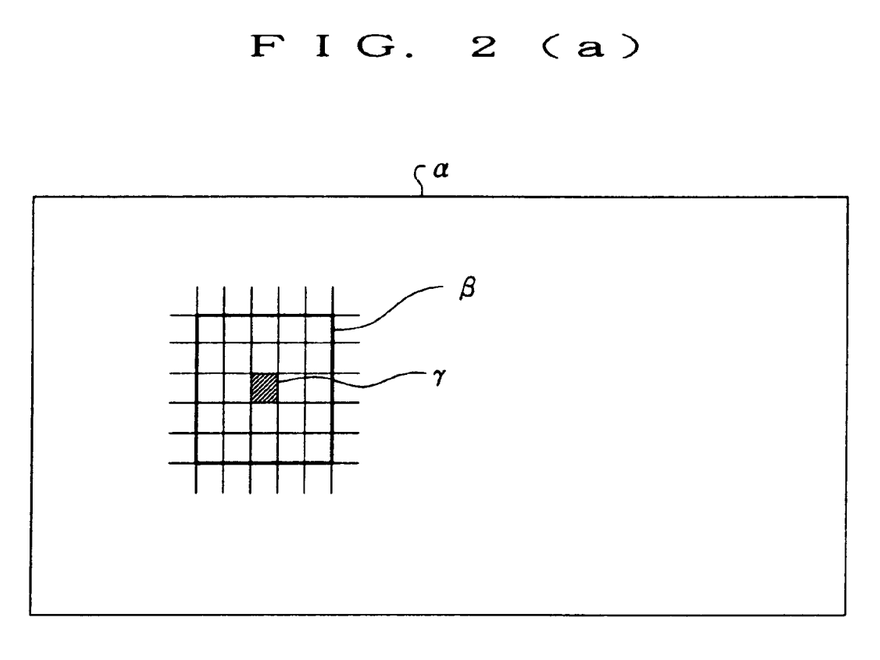
FIG. 2(a) is an explanatory drawing that schematically shows the relationship among a reading region, a specified region and a focused pixel in one embodiment of the present invention.
FIG. 2(b) is an explanatory drawing that indicates a case in which the density level of each pixel is represented by a function with respect to the relationship among the reading region, the specified region and the focused pixel shown in FIG. 2(a).

As illustrated in FIG. 2(a), the following description will exemplify a case in which a specified region β represents 5×5 pixels consisting of a focused pixel γ to be subjected to a filtering process and surrounding 24 pixels with respect to a read region α. Further, as illustrated in FIG. 2(b), the density level of each pixel is represented by the function r. Here, when the density level of the focused pixel γ is specified in positional relation to the surrounding pixels, it is represented by the function r(i,j) where the coordinate positions of the focused pixel γ on the read region α are represented by i and j. Moreover, the image-data signal $a_s$, which is to be inputted to the image-processing apparatus 1 in FIG. 1, is for example a serial-data signal with 8 bits obtained from a CCD sensor, etc.

Next, explanations will be briefly given of the frequency-degree extracting circuit 3, the comparison difference circuit 4 and the discrimination circuit 5 in the above-mentioned image-processing apparatus 1.

Figure 3:
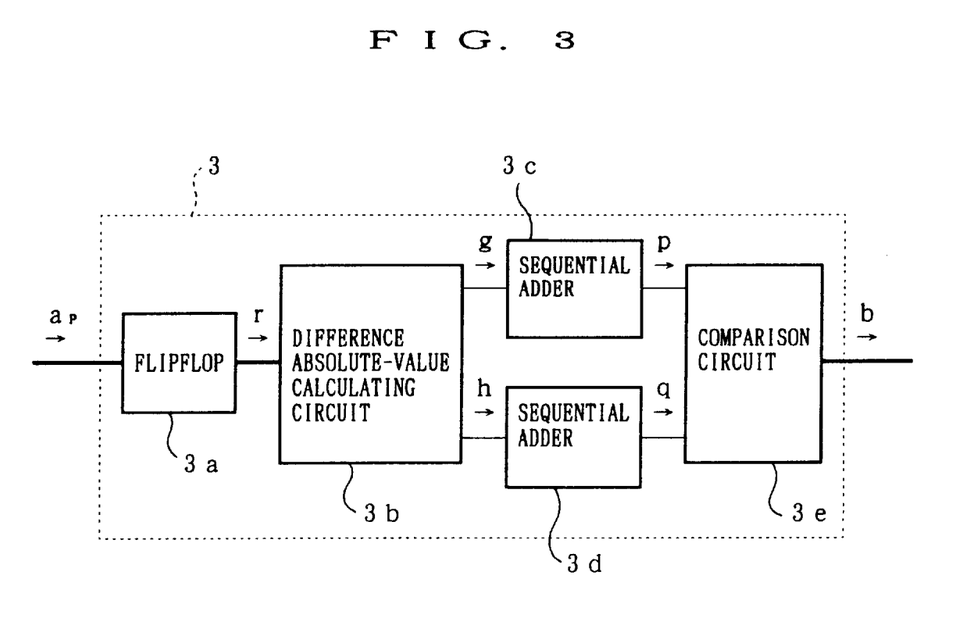
FIG. 3 is a block diagram showing a schematic construction of a frequency-degree extracting circuit shown in FIG. 1.

As illustrated in FIG. 3, the frequency-degree extracting circuit 3 is provided with a flipflop 3a, a difference absolute-value calculating circuit 3b, sequential adders 3c and 3d and a comparison circuit 3e.

The flipflop 3a temporarily latches the parallel image-data signal $a_p$ with five lines in the aforementioned specified region β, and outputs the density level r of each pixel. The difference absolute-value calculating circuit 3b calculates the absolute value g of the density-level difference between pixels adjoining in the line direction (the main-scanning direction) and the absolute value h of the density-level difference between pixels adjoining in the direction orthogonal to the lines (the sub-scanning direction). The sequential adder 3c adds the absolute values g and outputs the result p of the addition, and the sequential adder 3d adds the absolute values h and outputs the result q of the addition. Then, the comparison circuit 3e compares the results of the additions p and q in the sequential adders 3c and 3d.

Therefore, the parallel image-data signal $a_p$, which has been inputted from the line memories 2 to the frequency-degree extracting circuit 3, is subsequently outputted as the degree of frequency b with 14 bits; and the degree of frequency b is represented by the smaller of the results of the additions p and q.

Figure 4:
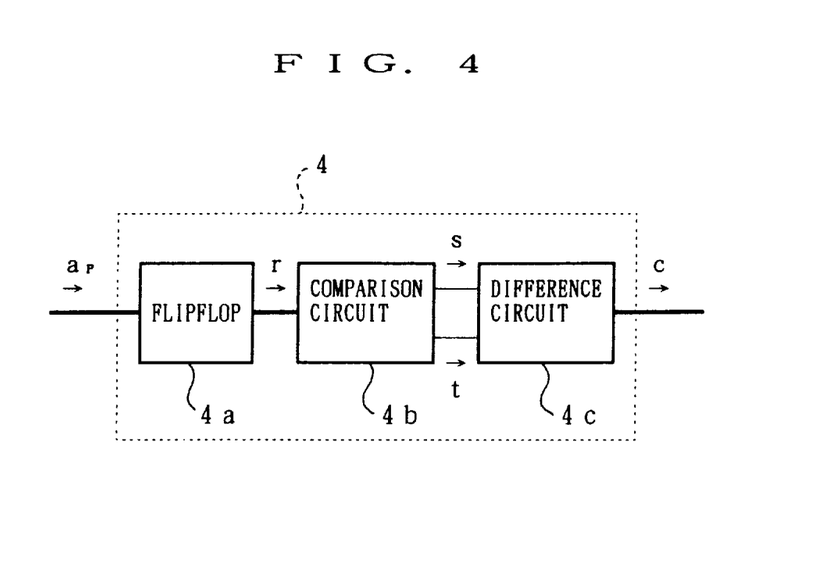
FIG. 4 is a block diagram showing a schematic construction of a comparison difference circuit shown in FIG. 1.

Moreover, as illustrated in FIG. 4, the comparison difference circuit 4 is provided with a flipflop 4a, a comparison circuit 4b and a difference circuit 4c.

The flipflop 4a temporarily latches the inputted parallel image-data signal $a_p$ in the specified region β, and outputs the density level r of each pixel. The comparison circuit 4b compares the density levels r of the respective pixels, and outputs the maximum value s and the minimum value t in the density levels within the specified region β. Then, the difference circuit 4c calculates the difference between the maximum value s and the minimum value t.

Therefore, the parallel image-data signal $a_p$, which has been inputted from the line memories 2 to the comparison difference circuit 4, is subsequently outputted as the comparison difference value c with 8 bits. The comparison difference value c represents by the difference between the maximum value s and the minimum value t in the density levels r of the 25 pixels within the specified region β.

Here, explanations will be given of the degree of frequency b and the comparison difference value c.

Among the focused pixel γ and the surrounding pixels within the specified region β, there is a relationship which properly changes in response to the kinds of region to which the focused pixel γ belongs. This changing relationship is referred to as the amount of feature X, which indicates the feature by which the kind of region to which the focused pixel γ belongs is discriminated. In the present embodiment, the degree of frequency b and the comparison difference value c are defined as the amount of feature X.

As described above, the degree of frequency b and the comparison difference value c can be represented by numeric changes. In other words, within the specified region β, the sum of the absolute values of the density-level difference between pixels adjoining in the main-scanning direction and the sum of the absolute values of the density-level difference between pixels adjoining in the sub-scanning direction are respectively found. The degree of frequency b is given as the smaller of the values of the sums thus obtained. Moreover, the comparison difference value c is given as the difference between the maximum value and the minimum value of the density levels of all the pixels within the specified region β.

In other words, in order to discriminate the feature of region to which the focused pixel γ belongs, it is necessary to discriminate the kind of region to which the focused pixel γ belongs, and the above-mentioned amount of feature X is applied to the discrimination as to the kind of region.

The degree of frequency b and the comparison difference value c are defined as the amount of feature X; and explanations will be given of the degree of frequency b and the comparison difference value c more specifically. For example, if the kind of the specified region β is a character region (a region consisting of only characters), borders between the peripheral portions of characters and the background normally form a state in which the difference between the density levels is relatively greater. For this reason, the difference between the maximum value and the minimum value in the density level within the specified region β, that is, the comparison difference value c, becomes greater. In contrast, since the color of characters tends to be continuity of the same density level, the degree of frequency b becomes smaller.

If the kind of the specified region β is a photograph region, the density level between adjoining pixels tends to change continuously within the specified region β that is a range consisting of 5×5 pixels. For this reason, since the difference between the adjoining pixels becomes smaller, the degree of frequency b also becomes smaller. Moreover, since the difference between the maximum value and the minimum value in the density levels of the respective pixels within the specified region β tends to become smaller, the comparison difference value c also becomes smaller. Here, the photographic region, exemplified in this case, means a region taken from a natural photograph, and even in the case of a photograph, if it shows characters, etc., there may be regions that are discriminated as the character regions.

Moreover, one of the methods for representing half tones by using a small number of colors is a method using halftone dots. A halftone-dot region represented by the halftone dots may be classified into one kind of photograph region. Here, let us assume that the size of the individual halftone dots is not substantially small with respect to the respective pixels within the specified region β.

In this case, depending on relationships between the pitch of the halftone dots and the pitch of the pixels, there is a possibility that the density level between adjoining pixels may change regularly. Therefore, in such a case, although the halftone-dot region is one kind of photograph region, it is classified as a different region that has a formal distinction over the photograph region.

Therefore, in the above-mentioned state, since the difference between the maximum value and the minimum value in the density level of the respective pixels within the specified region β becomes greater, the comparison difference value c becomes greater. Further, the above-mentioned halftone dots are entirely distributed within the specified region β. For this reason, the difference between adjoining pixels tends to become greater and the degree of frequency b also tends to become greater. In contrast, even in the case of a halftone-dot region, if the size of the individual halftone dots is substantially small with respect to the respective pixels within the specified region β, the region may be regarded as a photograph region.

As described above, within the specified region β, the kinds of region indicating the feature of an image can be represented by the degree of frequency b and the comparison difference value c that have been defined in the present embodiment.

Additionally, within the specified region β, the degree of frequency b is given as the smaller of the two sums, that is, the sum p of the absolute values of the density-level difference between pixels adjoining in the main-scanning direction and the sum q of the absolute values of the density-level difference between pixels adjoining in the sub-scanning direction. However, the comparison circuit $3e$, shown in FIG. 3, may be replaced by an adder (an addition means) so that the added value of the sum p and the sum q may be used as the degree of frequency b.

For example, let us assume that an image in the specified region β has a featured relationship between adjoining pixels in either the main-scanning direction or the sub-scanning direction. In such an image, when only either the sum p or the sum q is used as the degree of frequency b, there is a possibility that the wrong discrimination may be made, although the possibility is rare.

Therefore, by using the added value of the sum p and the sum q as the degree of frequency b, both of the relationships between adjoining pixels in the main-scanning direction and in the sub-scanning direction can be reflected. Thus, since the precision of information used for discriminating an image is increased, it becomes possible to further clarify the feature of the kind of region to which an image that has been read belongs. Consequently, it becomes possible to further improve the precision of discrimination.

Figure 5:
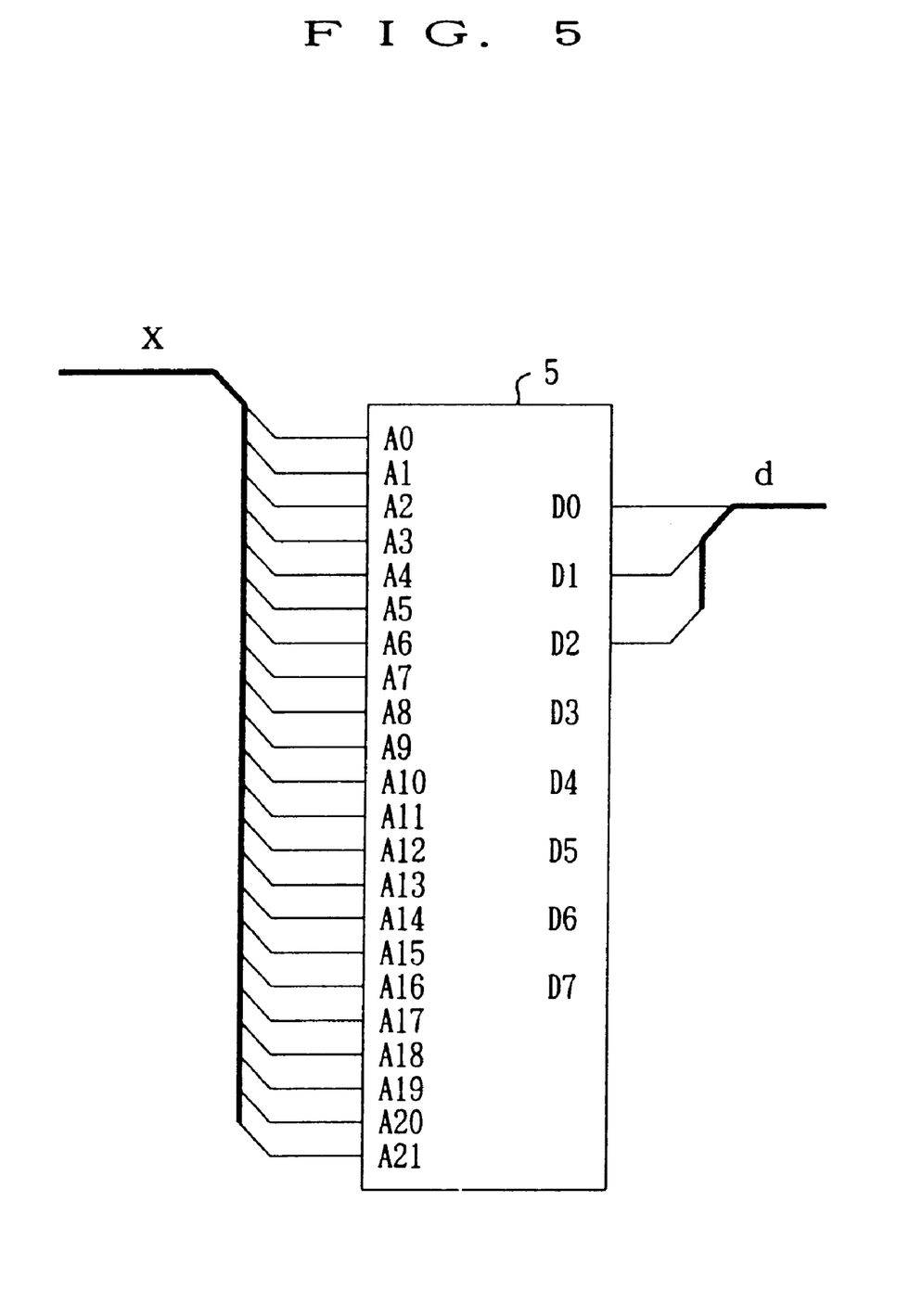
FIG. 5 is an explanatory drawing that shows a schematic construction of a discrimination circuit shown in FIG. 1.

Next, an explanation will be given of the discrimination circuit 5. The discrimination circuit 5 is constituted by a high-speed SRAM, and as shown in FIG. 5, it has input-side address terminals $A_0$ to $A_{21}$ corresponding to 22 bits including the degree of frequency b with 14 bits and the comparison difference value c with 8 bits as well as output-side address terminals $D_0$ to $D_7$ corresponding to 8 bits for outputting the result of discrimination d.

Figure 6:
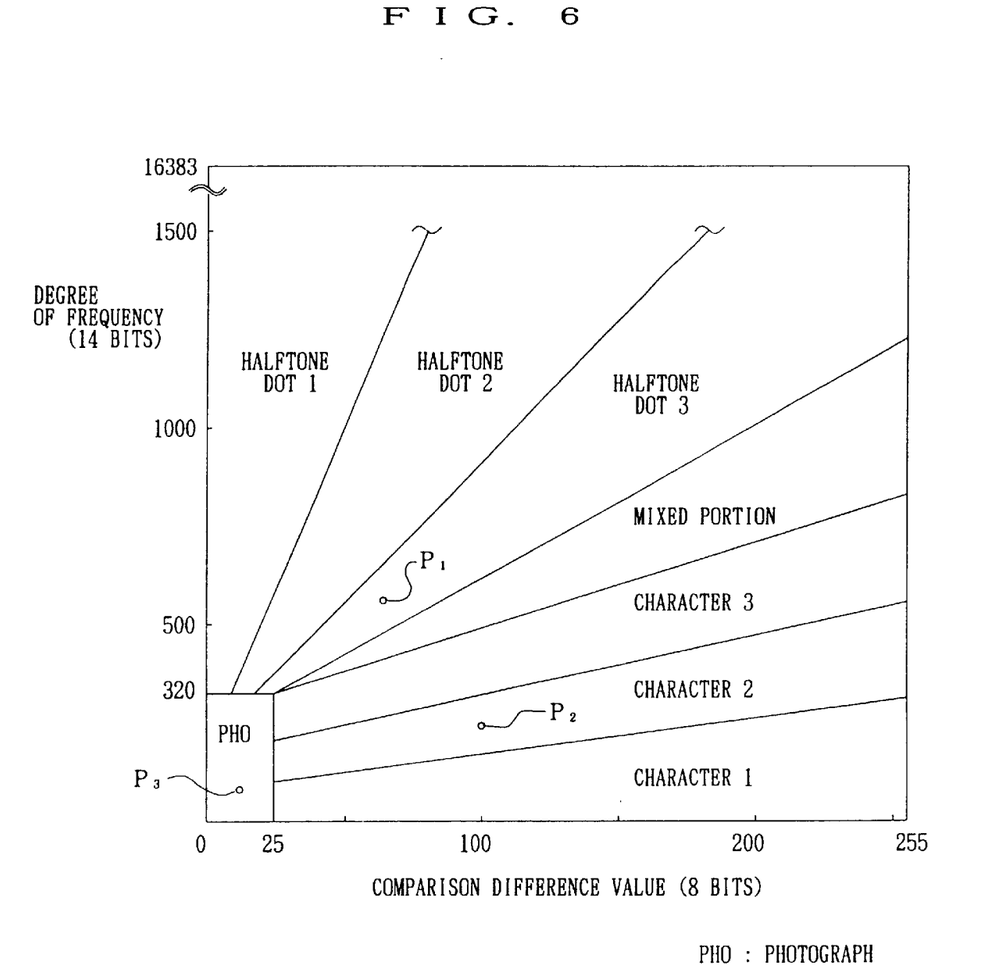
FIG. 6 is a drawing that shows a region-discriminating map that is determined by comparison difference values and the degree of frequency.

The discrimination circuit 5 discriminates the kind of region to which the focused pixel γ belongs by using a region-discriminating map as shown in FIG. 6. The region-discriminating map is made based upon the degree of frequency b and the comparison difference value c. Then, the kind of region to which the focused pixel γ belongs is discriminated depending on which part of the region-discriminating map the amount of feature X of the focused pixel γ is located, and it is outputted as the result of discrimination d.

In the region-discriminating map shown in FIG. 6, the kinds of region to be discriminated are classified into eight kinds, that is, a photograph region, three modes of halftone-dot regions 1 through 3, three modes of character regions 1 through 3, and a mixed region that has plurality of kinds of regions in a mixed manner and is difficult to be clearly discriminated. For this reason, the result of discrimination d uses only the output-side address terminals $D_0$ to $D_2$ corresponding to three bits.

Additionally, the halftone-dot regions are classified into the above-mentioned three modes depending on the features that are possessed by the halftone dots in a halftone-dot region in question, and in the same manner, the character regions are also classified into the three modes depending on the features that are possessed by the characters in a character region in question. However, the above-mentioned classifications are not intended to be limited by three modes; and they may be properly increased or decreased. Further, it is not necessary to make the numbers of modes of the halftone-dot regions and the character regions always coincident with each other.

In the above-mentioned region-discriminating map, it is possible to easily discriminate the kind of region to which the focused pixel γ belongs by plotting the combination of the degree of frequency b and the comparison difference value c on the corresponding position on the region-discriminating map. Further, since the kinds of regions are classified into the photograph region, the halftone-dot region, the character region and the mixed region, it becomes possible to carry out a filtering process more precisely.

Moreover, when the halftone-dot regions and the character regions are respectively classified into a more number of finer modes (three modes in the present embodiment), the filtering process can be carried out more precisely.

With respect to the arrangement of the image-processing apparatus 1 of the present embodiment, an explanation will be given of processing operations of image-data signals that are taken until a filtering mode e suitable for the focused pixel γ is found.

First, image-data signal $a_s$, read by the CCD or other devices, is inputted to the line memories 2 in the image-processing apparatus 1. The line memories 2, the number of which is four and which are connected in series with each other, are arranged so that a signal is taken out from the output side of each line memory 2. An image-data signal $a_s$ is converted into a parallel image-data signal $a_p$ by the signals that have been taken out, and outputted. The parallel image-data signal $a_p$ is a parallel signal with 8 bits which makes 5 lines of the aforementioned 5×5 pixels in the specified region β synchronous to the system clock.

The parallel image-data signal $a_p$ with 5 lines and 8 bits is inputted to the frequency-degree extracting circuit 3 and the comparison difference circuit 4. The frequency-degree extracting circuit 3 and the comparison difference circuit 4 respectively extract the degree of frequency b and the comparison difference value c in the specified region β from the parallel image-data signal $a_p$.

The degree of frequency b and the comparison difference value c are inputted to the discrimination circuit 5 as the aforementioned amount of feature X. Based upon the amount of feature X, the discrimination circuit 5 discriminates which kind of region, among the character region, the halftone-dot region and the photograph region on the aforementioned region-discriminating map, the focused pixel γ within the specified region β belongs to, and outputs the result of the discrimination d. Then, the mode-selection circuit 6 properly selects one of a plurality of filtering modes e that have been set in association with the kinds of regions to which the focused pixel γ belongs in accordance with the result of the discrimination d. The filtering mode e is inputted to the filtering-process circuit 7.

The filtering-process circuit 7 selects the kind of filtering process in accordance with the selected filtering mode e. In other words, the filtering process is selected with respect to the parallel image-data signal $a_p$ related to the specified region β. After the selected filtering process has been carried out, it is possible to attain the density level f of the focused pixel γ.

The following description will outline the filtering process and discuss the filtering-process circuit 7 in detail.

Figure 7:
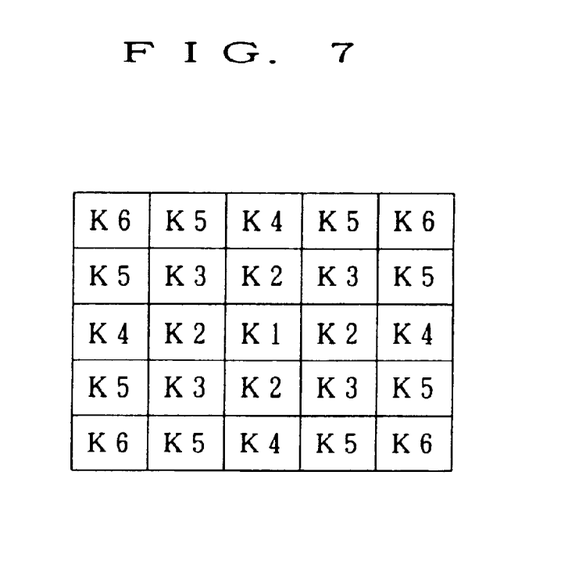
FIG. 7 is an explanatory drawing that indicates a coefficient map in a filtering process.
Figure 8:
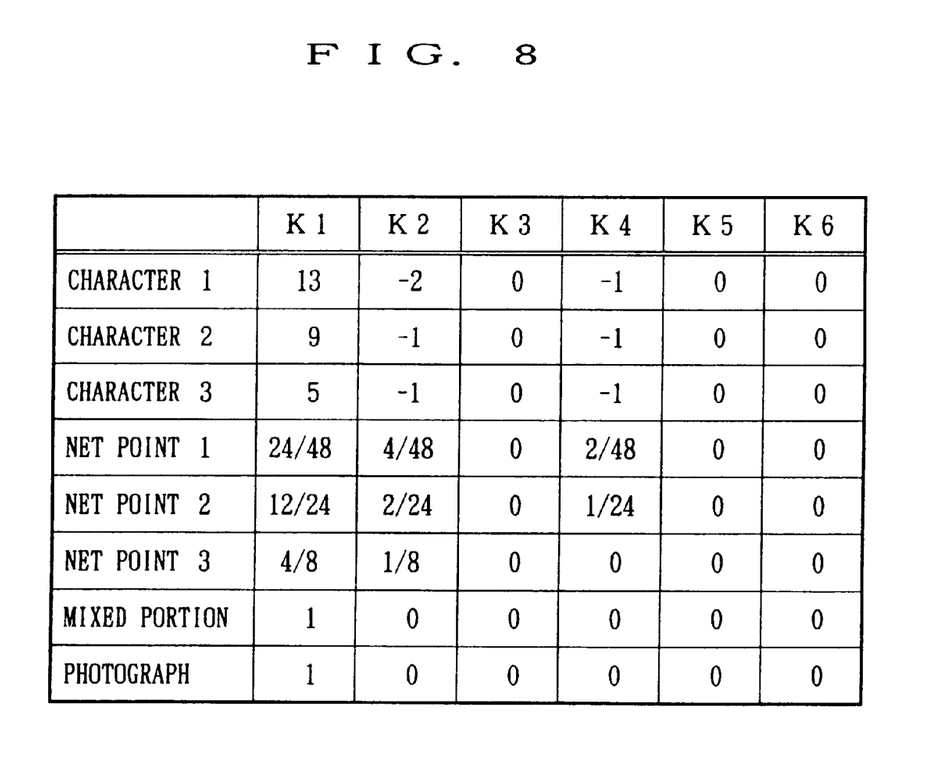
FIG. 8 shows a table that indicates the combination of coefficients for each mode that is applied to the coefficient map of FIG. 7.

As illustrated in FIG. 7, the filter used in the filtering process is a coefficient map in which coefficients $K_1$ through $K_6$, which can be set in the range of −16 to +16, are arranged with respect to the specified region β consisting of 5×5 pixels. In other words, the filter is a coefficient map made of combinations of a plurality of coefficients. The combinations of the respective coefficients $K_1$ through $K_6$ is set in accordance with the filtering mode e as shown in FIG. 8.

Figure 9A:
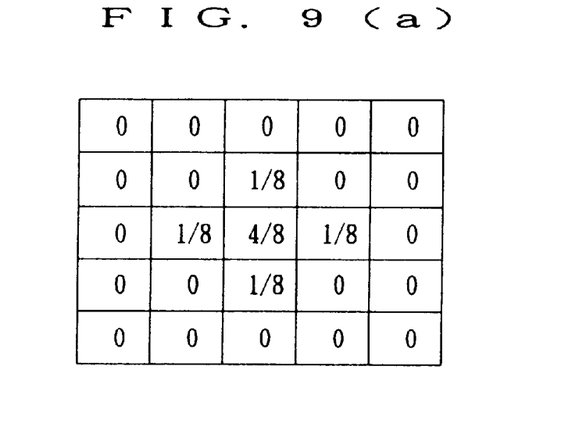
FIG. 9(a), which is a coefficient map in which the combination of coefficients for a specific mode in a smoothing process of FIG. 8 is applied to FIG. 7, indicates the coefficient map in the region of halftone dot 3.

For example, let us assume that the combination of the amount of feature X at a certain specified region β is represented by: the degree of frequency b=560 and the comparison difference value c=64. In this case, on the region-discriminating map shown in FIG. 6, the amount of feature X is plotted at a position indicated by reference symbol $P_1$. Therefore, the kind of region to which the focused pixel γ within the specified region β belongs can be discriminated as halftone dot 3. Based on the result of the discrimination, the combination of the coefficients Kn suitable for halftone dot 3 is selected from the combinations as shown in FIG. 8. Then, the combination of the coefficients Kn provides a filter having a coefficient map as shown in FIG. 9(a), and a filtering process is carried out on the parallel image-data signal $a_p$ by using this filter.

Figure 9B:
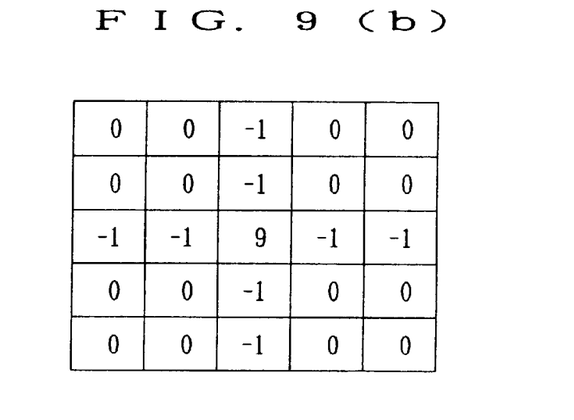
FIG. 9(b) indicates the coefficient map in the region of character 2.

Similarly, supposing that the combination of the amount of feature X is represented by: the degree of frequency b=240 and comparison difference value c=100, the amount of X is plotted at a position indicated by reference symbol $P_2$ on the region-discriminating map shown in FIG. 6. Thus, the kind of region to which the focused pixel γ belongs can be discriminated as character 2. Based on the result of the discrimination, it is possible to obtain a filter having a coefficient map as shown in FIG. 9(b) through the combination as shown in FIG. 8.

Figure 9C:
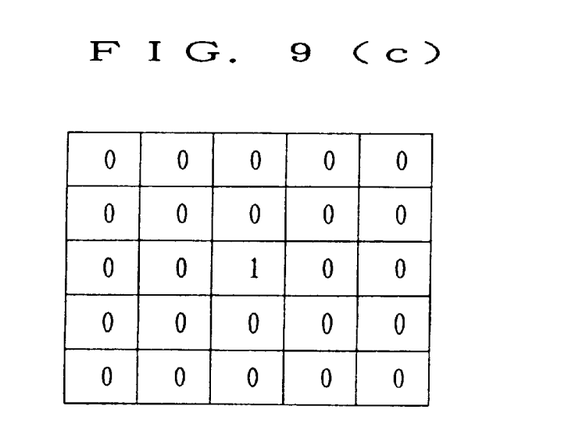
FIG. 9(c) indicates the coefficient map in the region of a photograph.

Further, supposing that the combination of the amount of feature X is represented by: the degree of frequency b=80 and comparison difference value c=12, the amount of X is plotted at a position indicated by reference symbol $P_3$ on the region-discriminating map shown in FIG. 6. Thus, the kind of region to which the focused pixel γ belongs can be discriminated as "PHO (photograph)". Based on the result of the discrimination, it is possible to obtain a filter having a coefficient map as shown in FIG. 9(c) through the combination as shown in FIG. 8.

The combination of the respective coefficients Kn is basically set so that: in the case when the region to which the focused pixel γ belongs is the character region, an emphasizing process is carried out, and in the case of the halftone-dot, a smoothing process is carried out. Moreover, in the case of the photograph region or the mixed region corresponding to a border between the halftone-dot region and the character region, a filtering process is carried out on the parallel image-data signal $a_p$ in a manner so as not to apply any correction. In other words, the combinations of the respective coefficients are set in association with the kinds of region to be discriminated.

When the filter is constituted by a coefficient map as described above, it is not necessary to change the basic construction of the filter used in the filtering process. Therefore, it is not necessary to provide a plurality of filters that correspond to the kinds of regions, and consequently, it becomes possible to easily obtain a filter that corresponds to the kind of region that has been discriminated merely by changing the combination of the coefficients.

Moreover, changes in the combination of the respective coefficients Kn are set as the filtering modes e. Since the filtering modes e correspond to the kinds of regions, it is possible to easily select a filter suitable for the filtering process by selecting one of the filtering modes e by using the mode-selection circuit 6.

The following description will discuss the arrangement and operations of the filtering-process circuit 7.

Figure 10:
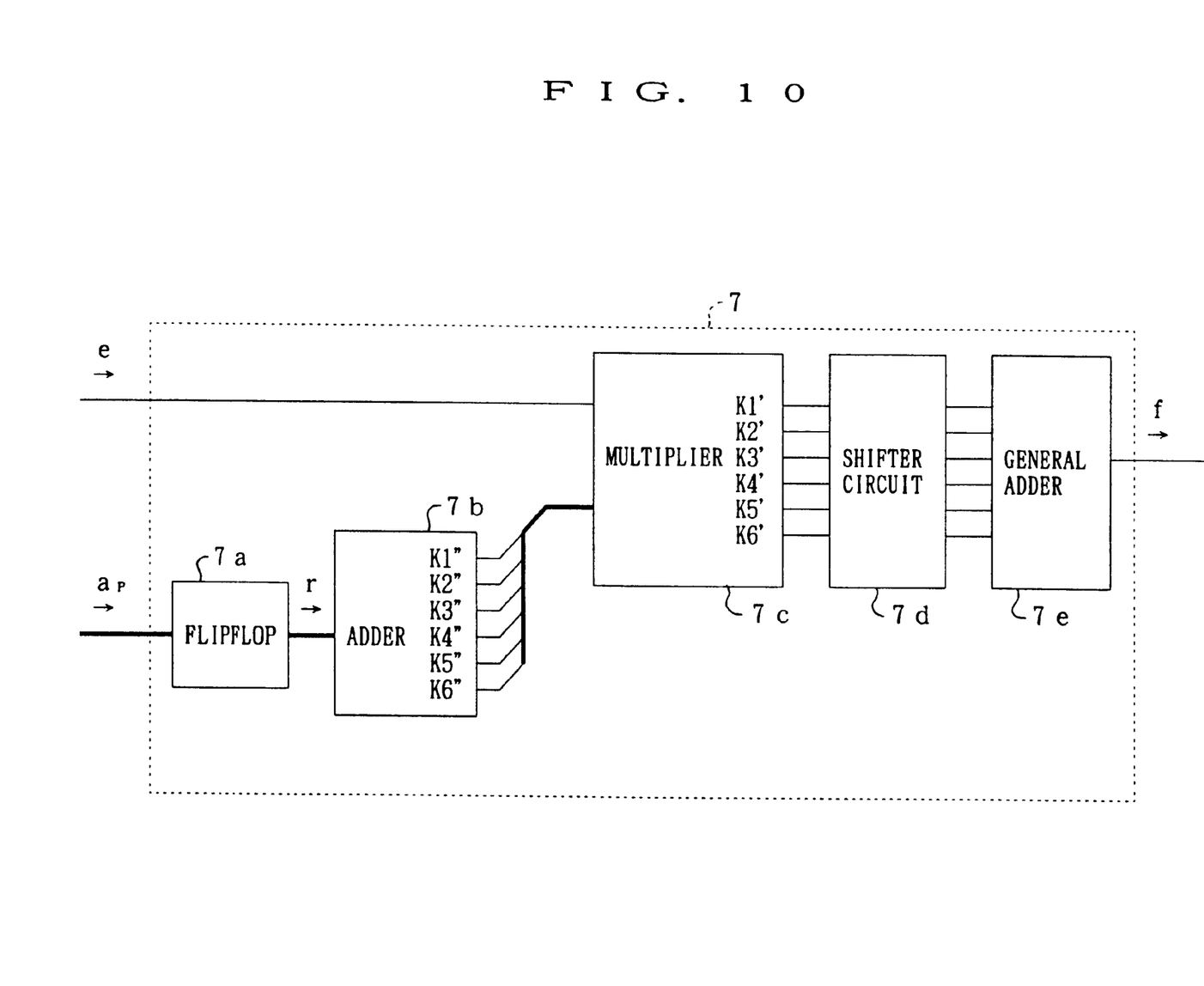
FIG. 10 is a block diagram showing a schematic construction of a filtering-process circuit.

As illustrated in FIG. 10, the filtering-process circuit 7 is provided with a flipflop 7a, an adder 7b, a multiplier 7c, a sifter circuit 7d and a general adder 7e.

The flipflop 7a temporarily latches the parallel image-data signal $a_p$, and outputs the density level r. The adder 7b adds the density levels r of the corresponding pixels within the specified region β for each coefficient Kn, which will be described later, and outputs the result of addition Kn". The multiplier 7c multiplies the result of addition Kn" and the coefficient Kn, and outputs the result of multiplication Kn'. The shifter circuit 7d shifts the result of addition Kn" for each coefficient Kn so as to make the calculation of the result of multiplication Kn' easier. The general adder 7e adds the respective results of multiplication Kn' that have been obtained through the shifter circuit 7d, and outputs the sum f.

In the above-mentioned adder 7b, the results of addition Kn" of the density levels r corresponding to the respective pixel positions for each coefficient Kn are provided based upon the coefficient map (filter) shown in FIG. 7 and the pixel data within the specified region β. The results of addition Kn" are indicated by the following equations based upon the function indicating the density level r shown in FIG. 2(b) and the coefficient map shown in FIG. 7:

K1"=r(i,j)

K2"=r(i,j−1)+r(i−1,j)+r(i+1,j)+r(i,j+1)

K3"=r(i−1,j−1)+r(i+1,j−1)+r(i−1,j+1)+r(i+1,j+1)

K4"=r(i,j−2)+r(i−2,j)+r(i+2,j)+r(i,j+2)

K5"=r(i−1,j−2)+r(i+1,j−2)+r(i−2,j−1)+r(i+2,j−1) +r(i−2,j+1)+r(i+2,j+1)+r(i−1,j+2)+r(i+1,j+2)

K6"=r(i−2,j−2)+r(i+2,j−2)+r(i−2,j+2)+r(i+2,j+2)

Then, multiplication is carried out between the result of addition Kn" and the coefficient Kn by the multiplier 7c, and the result of multiplication Kn' is obtained. The result of multiplication Kn' is represented as follows:

$Kn'=Kn \times Kn''$ (where n=1 to 6).

In order to allow the calculation of the result of multiplication Kn' to be performed using integral numbers, the solution for each coefficient Kn is shifted by the shifter circuit 7d in accordance with the amount of shift (maximum 1/128·7 bits right shift), and the general adder 7e calculates and outputs the sum f of the results Kn' that have been shifted as described above.

$f=K1'+K2'+K3'+K4'+K5'+K6'$.

The above-mentioned sum f represents the density level r of each pixel within the specified region β and a density level which will be obtained after a filtering process with respect to the focused pixel γ that is obtained based upon the kind of the specified region β.

Since the filtering-process circuit 7 is arranged as described above, it becomes possible to smoothly carry out the filtering process based upon the above-mentioned coefficient map.

As described above, the image-region discriminating method of the present invention, which is an image-region discriminating method for discriminating, from multi-value image data obtained by scanning an original document, the feature of a region to which respective pixels on the image belong, is provided with the steps of, based upon all image data within a specified region β including a focused pixel γ that serves as a target for discriminating the feature of a region to which respective pixels on an image belong and a plurality of adjacent pixels located around the focused pixel γ, extracting the amount of feature X indicating the feature of the region to which the focused pixel γ belongs, and discriminating the kind of the region to which the focused pixel γ belongs based upon the amount of feature X.

In the above-mentioned method, in the case when the kind of region is discriminated with respect to each focused pixel γ, not only the image data regarding the focused pixel γ, but also the image data of the adjacent pixels surrounding the focused pixel γ, is utilized. Thus, it is possible to improve the discrimination precision for specifying the region to which the focused pixel γ belongs; consequently, for example, it becomes possible to carry out appropriate image processing operations in accordance with the results of discrimination.

Moreover, since the image-processing apparatus 1 of the present invention has the above-mentioned arrangement, the feature of an image is properly discriminated by the above-mentioned image-region discriminating method, and it is possible to carry out image-processing operations suitable for the feature of the image. In particular, the amount of feature X, used for discriminating the kind of region to which the focused pixel γ belongs within the specified region γ, includes the degree of frequency b and the comparison difference value c. Therefore, the discrimination precision for the kind of region to which an image that has been read belongs is further improved.

Embodiment 2

Referring to Figures, the following description will discuss another embodiment of the present invention. Here, for convenience of explanation, those members that have the same functions and that are described in embodiment 1 with reference to the Figures are indicated by the same reference numerals and the description thereof is omitted.

Figure 11:
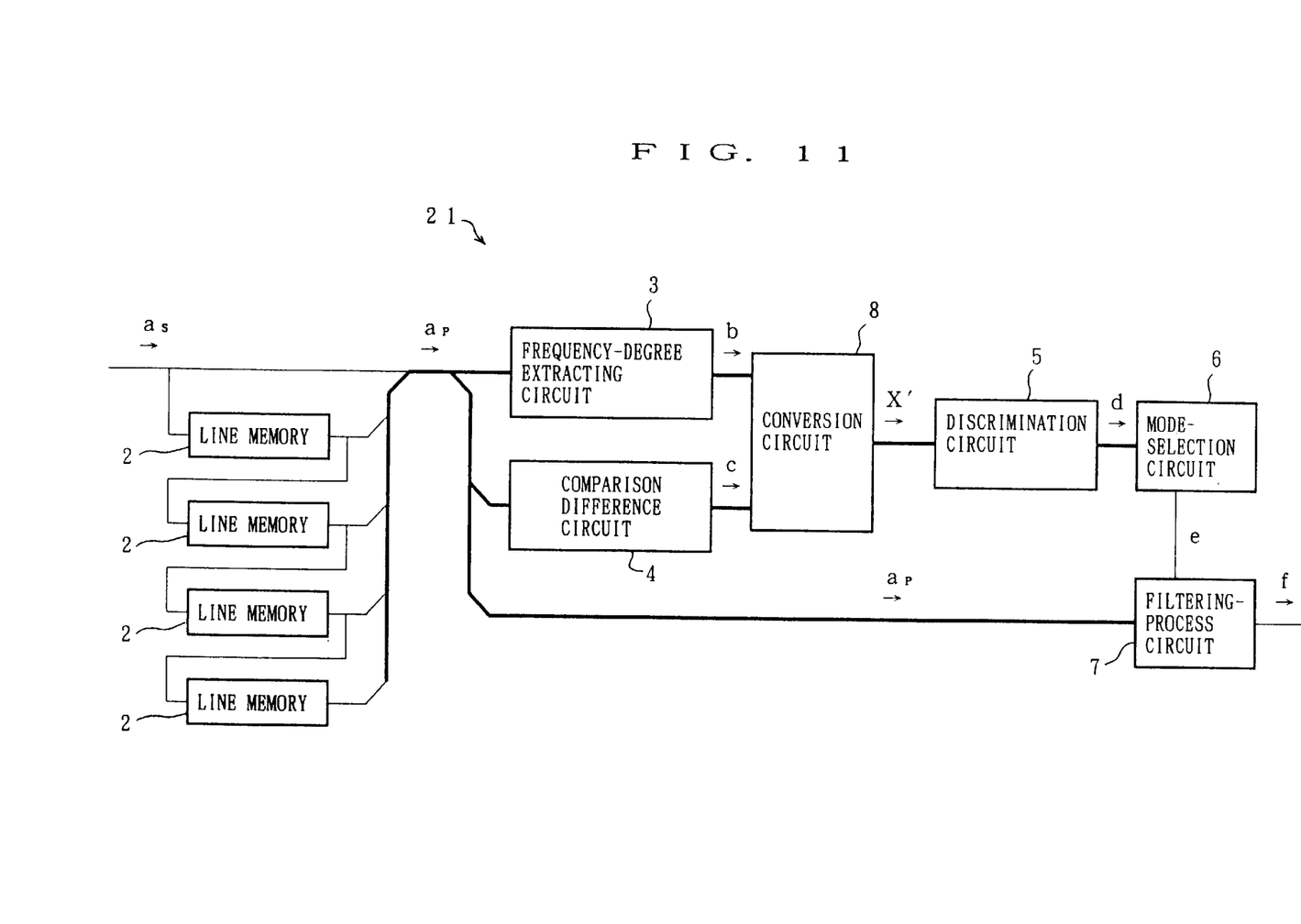
FIG. 11 is a block diagram showing a schematic construction of an image-processing apparatus in accordance with another embodiment of the present invention.

The image-processing apparatus 21 of the present embodiment differs from that of Embodiment 1 in that, as illustrated in FIG. 11, a conversion section 8 is installed between the frequency-degree extracting circuit 3 as well as the comparison difference circuit 4 and the discrimination circuit 5. The conversion section 8 converts the amount of feature X with respect to the specified region β to the amount of feature X'. The amount of feature X' has a reduced number of bits, and is inputted to the discrimination circuit 5.

As explained in the aforementioned Embodiment 1, the amount of feature X consists of the frequency-degree b and the comparison difference value c. However, in the case of the degree of frequency b expressed by 14 bits, when it becomes greater beyond a certain extent, there appears a region in which discrimination can be made as the halftone-dot region regardless of the value of the comparison difference value c. Here, slight differences in low-order bits hardly affect the discrimination.

For this reason, even if the amount of feature X' whose bit number is reduced by eliminating upper bits and lower bits is used, the amount of information in the amount of feature X is hardly impaired. Therefore, in the image-processing apparatus 21 of the present embodiment, the reduction of data is achieved by eliminating the number of bits in the degree of frequency b and the comparison difference value c as described above.

For example, the following table shows a case in which amounts of feature X at respective positions $P_1$, $P_2$ and $P_3$, shown on the region-discriminating map of FIG. 6 in Embodiment 1, are indicated by bit display, that is, binary digits:

| | BIT DISPLAY OF AMOUNT OF FEATURE X | | | |
|---|---|---|---|---|
| | Degree of Frequency b | | Comparison Difference Value c | |
| $P_1$ | 00000100110000 | (560) | 01000000 | (64) |
| $P_2$ | 00000011110000 | (240) | 01100100 | (100) |
| $P_3$ | 00000001010000 | (80) | 00001100 | (12) |

*Numbers in parentheses represent decimal digits.

In each bit display, 1st through 3rd bits and 11th through 14th bits of the degree of frequency b hold 0. Therefore, it is regarded that no information is held in the high-order bits and the low-order bits. Further, in each bit display, 1st, 2nd and 8th bits of the comparison difference value c hold 0. Therefore, it is also regarded that no information is held in the high-order bits and the low-order bits. Consequently, it is considered that even if the degree of frequency b is indicated by 7 bits from the 4th bit to the 10th bit and the comparison difference value c is indicated by 5 bits from the 3rd bit to the 7th bit, no information is lost with respect to the amount of information.

Here, let us assume that the degree of frequency b is 561. In the case of bit display, the degree of frequency b is (00000100110001), and when the digits from 4th bit to 10th bit are extracted, the degree of frequency b shows the same bit display as in the case of 560. However, even if the degree of frequency b is reduced by just 1, no change is made about the fact that $P_1$ is located in the region of halftone dots 3 on the region-discriminating map shown in FIG. 6. Therefore, virtually any affect is hardly given on the discrimination as to which region the focused pixel γ belongs to.

The amount of feature X originally consists of the degree of frequency b of 14 bits and the comparison difference value c of 8 bits. However, the degree of frequency b and the comparison difference value c are respectively reduced to 7 bits and 5 bits by eliminating the low-order and high-order bits having no information so that the amount of feature X with 22 bits is converted to the amount of feature X' with 12 bits. As a result, since the memory capacity of the discrimination circuit 5 is reduced, it is possible to reduce costs in the image-processing apparatus 21 and also to achieve high speeds resulted from a reduction in the data-processing amount.

Embodiment 3

Referring to Figures, the following description will discuss still another embodiment of the present invention. Here, for convenience of explanation, those members that have the same functions and that are described in the aforementioned embodiments are indicated by the same reference numerals and the description thereof is omitted.

Figure 12:
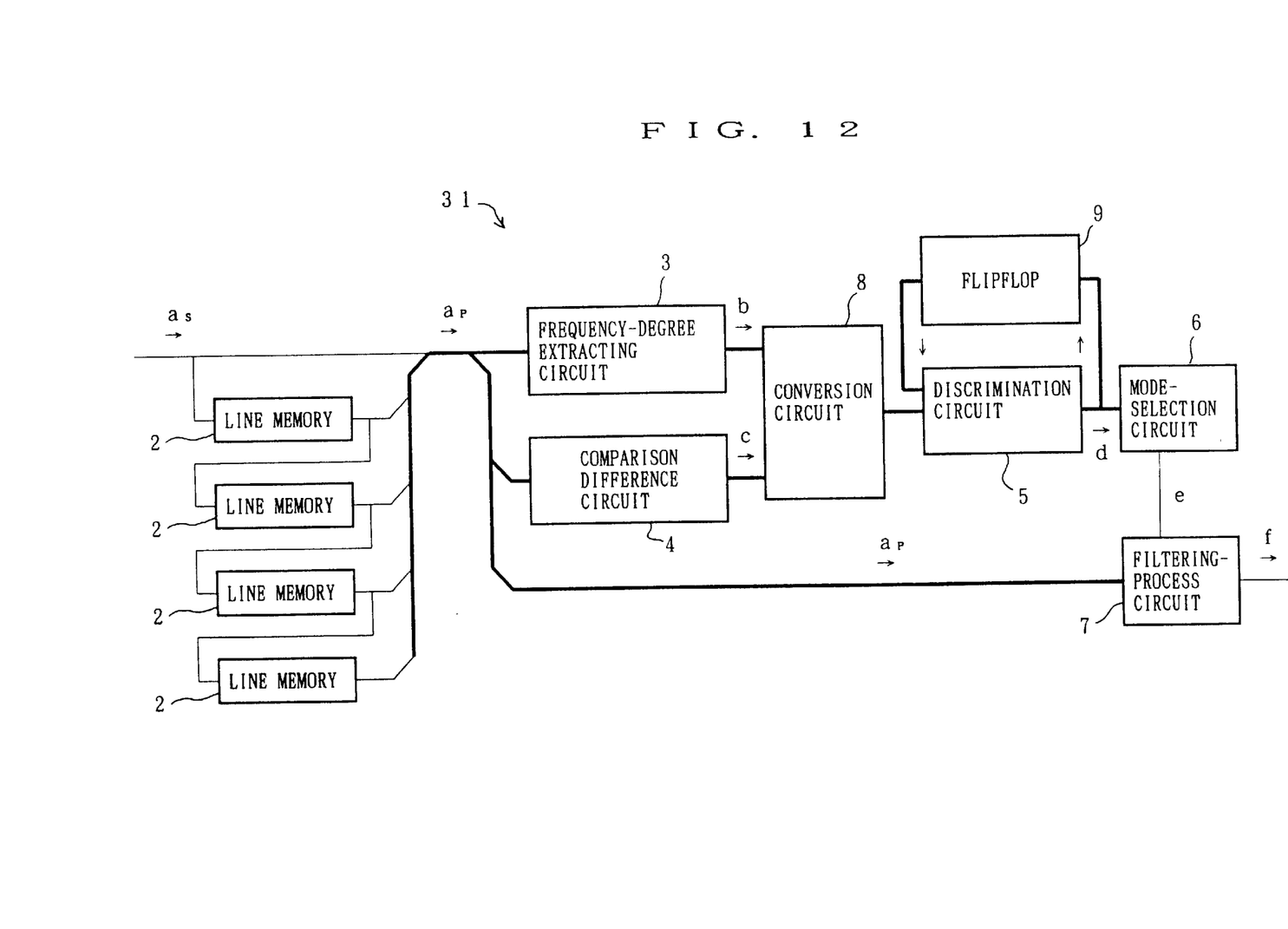
FIG. 12 is a block diagram showing a schematic construction of an image-processing apparatus in accordance with still another embodiment of the present invention.

As illustrated in FIG. 12, in addition to the arrangement of the aforementioned Embodiment 2, the image-processing apparatus 31 of the present embodiment is provided with a flipflop 9. The flipflop 9 stores the result of discrimination as to which region, among the character region, the halftone-dot region and the photograph region, the focused pixel γ within the specified region β belongs to, which is obtained in the discrimination circuit 5, by an amount corresponding to only one pixel. Then, the output of the flipflop 9 is inputted to the discrimination circuit 5 together with the amount of feature X'.

In the above-mentioned arrangement, while taking into consideration the result of discrimination of the pixels obtained immediately before, the next region-discriminating operation can be carried out. For example, let us assume that in spite of the fact that a certain pixel $\gamma_0$ has been discriminated as the photograph region, a pixel $\gamma_1$ which succeeds the pixel $\gamma_0$ is discriminated as an entirely different kind of region. In such a case, dusts, noise, etc. on the reading region α might give adverse effects on the discrimination of the kind of region.

Normally, when discriminating the kind of region to which the focused pixel γ belongs, the result of discrimination depends on the size of the specified region β to a certain extent, and there is a possibility that various results of discrimination might be obtained for respective pixels. In an actual operation, however, there are only few cases where the kind of region changes for each adjoining pixel. However, because of an erroneous input of the amount of feature X due to noise or dusts as described above, the pixel $\gamma_1$ might be discriminated as a kind of region that differs from the actual kind of region of the image.

For this reason, the result of discrimination as to whether the pixel $\gamma_0$ is fed back, and the discrimination is carried out as to which kind of region the pixel $\gamma_1$ belongs to. In other words, by taking into consideration the result of discrimination as to the pixel $\gamma_0$ immediately before the pixel $\gamma_1$, the discrimination is carried out as to which kind of region the pixel $\gamma_1$ belongs to. Therefore, it becomes possible to reduce the probability of occurrence of erroneous discrimination in which the kind of region to which the focused pixel γ belongs is erroneously discriminated. Consequently, it becomes possible to carry out the discrimination as to the kind of region with high precision.

Figure 13:
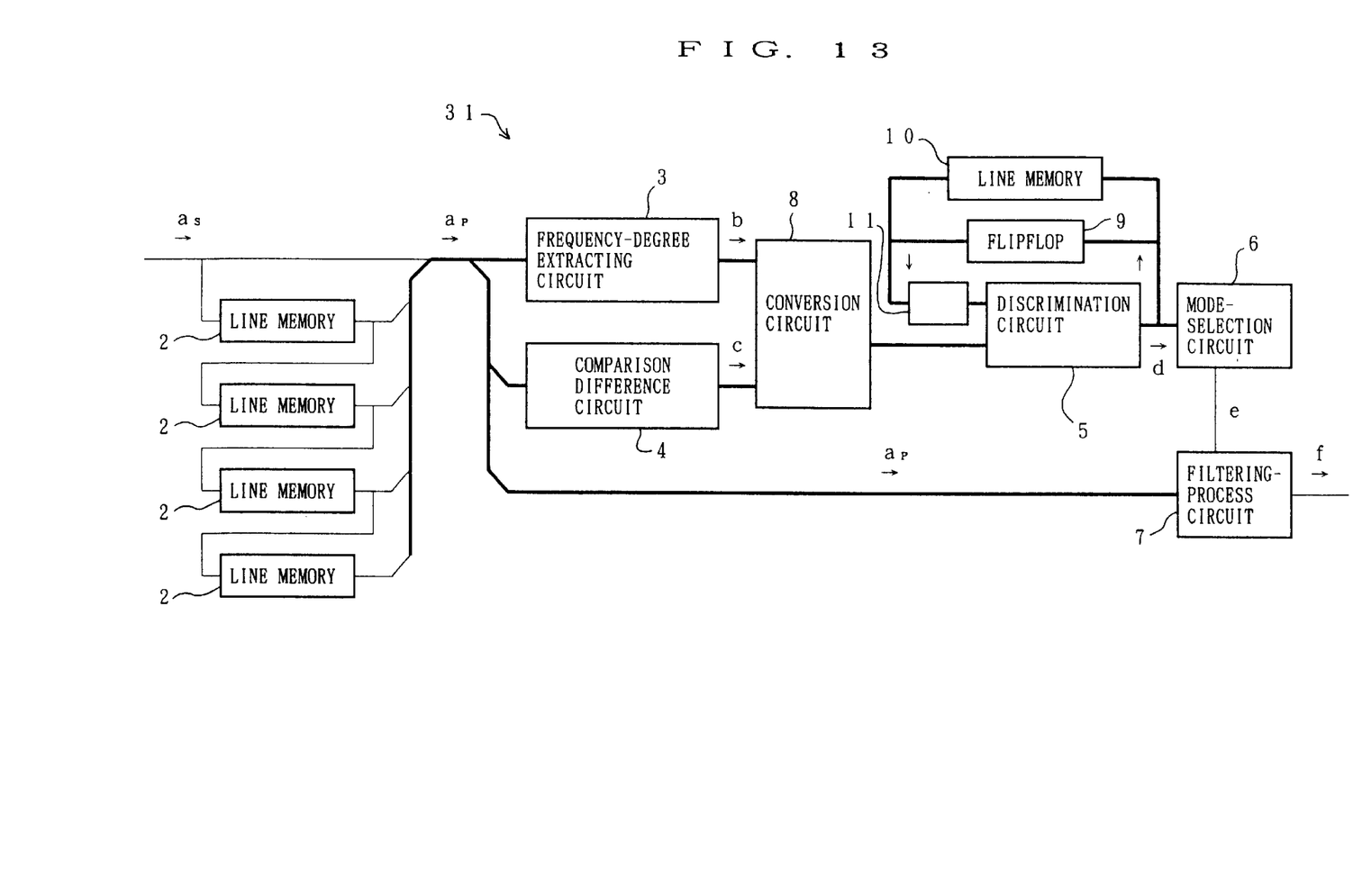
FIG. 13 is a block diagram showing a schematic construction of an image-processing apparatus in accordance with the other embodiment of the present invention.

Moreover, as illustrated in FIG. 13, a line memory 10 may be installed in the image-processing apparatus 31 in parallel with the flipflop 9. By installing the line memory 10, the result of discrimination not only as to the pixel located immediately before, but also as to the entire line located immediately before, can be fed back; that is, the result of discrimination as to all pixels included in one line within the specified region β can be fed back.

An explanation is given by means of the above-mentioned example as follow: In the case when the pixel $\gamma_1$ is taken as the focused pixel γ, the result of discrimination not only as to the pixel $\gamma_0$ located immediately before, but also as to the entire line to which the pixel $\gamma_0$ belongs, can be fed back. Therefore, it becomes possible to further reduce the probability of occurrence of erroneous discrimination, and also to carry out the discrimination as to which kind of region the focused pixel γ belongs to with higher precision.

In the above-mentioned arrangement, it is preferable to discriminate the kind of region to which the focused pixel γ belongs based upon the result of discrimination of an adjoining pixel the kind of region of which has been discriminated prior to the focused pixel γ the kind of region of which is to be discriminated, as well as based upon the amount of feature X that indicates characteristics of the region to which the focused pixel γ belongs.

In this arrangement, by utilizing the result of discrimination of an adjoining pixel the kind of region of which has been discriminated prior to the focused pixel γ the kind of region of which is to be discriminated, judgement can be made as to whether or not the result of discrimination as to which kind of region the focused pixel γ belongs to is correct. Therefore, it becomes possible to carry out the discrimination as to the kind of region with high precision.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-region discriminating method comprising the steps of:
   based upon all image data within a specified region including a focused pixel that serves as a target for discriminating the feature of a region to which respective pixels on an image belong and a plurality of adjacent pixels located around the focused pixel, extracting an amount of feature indicating the feature of the region to which the focused pixel belongs, the step of extracting the amount of feature including the steps of
      extracting a degree of frequency from the specified region by obtaining a first sum of absolute values of the density-level difference between pixels adjoining in a line direction of the pixels within the specified region and a second sum of absolute values of the density-level difference between pixels adjoining in a direction orthogonal to the line of the pixels, and
      extracting a comparison difference value from the specified region by obtaining a difference between a maximum value and a minimum value of density-level of all the pixels within the specified region,
      wherein the amount of feature includes the degree of frequency and the comparison difference value; and
      discriminating the kind of the region to which the focused pixel belongs based upon the amount of feature.

2. The image-region discriminating method as defined in claim 1, wherein the extracted degree of frequency is the smaller of the first sum and the second sum.

3. The image-region discriminating method as defined in claim 2, wherein the extracted degree of frequency is the addition of the first sum and the second sum.

4. An image-region discriminating method, comprising the steps of:
   based upon all image data within a specified region including a focused pixel that serves as a target for discriminating the feature of a region to which respective pixels on an image belong and a plurality of adjacent pixels located around the focused pixel, extracting an amount of feature indicating the feature of the region to which the focused pixel belongs;
   discriminating the kind of the region to which the focused pixel belongs based upon the amount of feature; and
   discriminating the kind of the region to which the focused pixel belongs, based upon the result of discrimination of an adjoining pixel the kind of region of which has been discriminated prior to the focused pixel that is to be discriminated, as well as based upon the amount of feature that indicates the feature of the region to which the focused pixel belongs.

5. An image-processing apparatus comprising:
   a feature-amount extracting circuit which, based upon all image data within a specified region including a focused pixel that serves as a target for discriminating the feature of a region to which respective pixels on an image belong and a plurality of adjacent pixels located around the focused pixel, extracts the amount of feature indicating the feature of the region to which the focused pixel belongs, the feature-amount extracting circuit including
      a frequency-degree extracting circuit for extracting a degree of frequency from the specified region by obtaining a first sum of absolute values of the density-level difference between pixels adjoining in a line direction of the pixels within the specified region and a second sum of absolute values of the density-level difference between pixels adjoining in a direction orthogonal to the line of the pixels, and
      a comparison difference circuit for extracting a comparison difference value from the specified region by obtaining a difference between a maximum value and a minimum value of density-level of all the pixels within the specified region,
      wherein the amount of feature includes the degree of frequency and the comparison difference value;
   a discrimination circuit which releases discrimination information on a region to which the focused pixel belongs based upon the amount of feature;
   a filter-selecting circuit which, based upon the discrimination information, selects a filter among a plurality of set filters that is appropriate for the discrimination information; and
   a filtering-process circuit for carrying out a filtering-process by using the selected filter.

6. The image-processing apparatus as defined in claim 5, wherein the frequency-degree extracting circuit outputs as the degree of frequency the smaller of the first sum and the second sum.

7. The image-processing apparatus as defined in claim 6, wherein the frequency-degree extracting circuit outputs as the degree of frequency the addition of the first sum and the second sum.

8. The image-processing apparatus as defined in claim 6, wherein the discrimination circuit comprises a region-discriminating map that is made based upon the degree of frequency and the comparison difference value, in order to discriminate the kind of region to which the focused pixel belongs.

9. The image-processing apparatus as defined in claim 8, wherein the region-discriminating map includes a photographic region, a halftone-dot region and a character region as regions that are to be discriminated.

10. The image-processing apparatus as defined in claim 9, wherein the region-discriminating map further includes a mixed region that is impossible to be discriminated because of a mixed state of the photographic region, the halftone-dot region and the character region, as a kind of region that is to be discriminated.

11. The image-processing apparatus as defined in claim 10, wherein the halftone-dot region is classified into a plurality of modes, each corresponding to the feature of halftone dots that is possessed by the halftone-dot region in question.

12. The image-processing apparatus as defined in claim 10, wherein the character region is classified into a plurality of modes, each corresponding to the feature of characters that is possessed by the character region in question.

13. The image-processing apparatus as defined in claim 5, wherein: the filter is a coefficient map made of combinations of a plurality of coefficients that have been preset depending on filtering modes and the filter-selecting circuit is a mode-selection circuit that properly selects one of a plurality of filtering modes that have been set in accordance with the kinds of regions based upon the discrimination information.

14. The image-processing apparatus as defined in claim 13, wherein the combinations of the coefficients in the coefficient map are set in accordance with the kinds of regions that are to be discriminated.

15. The image-processing apparatus as defined in claim 13, wherein the filtering-process circuit includes an adder for adding the density levels of the corresponding pixels within the specified region for each coefficient in the coefficient map and for outputting the result of the addition, a multiplier for multiplying the result of the addition and the coefficient and for outputting the result of the multiplication, and a general adder for adding the respective results of the multiplications for each coefficient and for outputting the sum.

16. The image-processing apparatus as defined in claim 15, further comprising: a shifter circuit for shifting the result of the addition for each coefficient.

17. The image-processing apparatus as defined in claim 5, wherein: the amount of feature is represented by bits, and a conversion section, which eliminates upper bits and lower bits of the amount of feature, is installed in a manner so as to virtually maintain the amount of information that is possessed by the amount of feature.

18. The image-processing apparatus as defined in claim 17, further comprising a flipflop for storing the discrimination information corresponding to one pixel, and for outputting the discrimination information corresponding to one pixel to the discrimination circuit.

19. The image-processing apparatus as defined in claim 18, further comprising a line memory which is installed in parallel with the flipflop and which stores discrimination information as to all pixels included in one line within the specified region, and outputs the discrimination information as to all the pixels to the discrimination circuit.

* * * * *